(12) United States Patent
Kallstrom et al.

(10) Patent No.: US 11,331,830 B2
(45) Date of Patent: May 17, 2022

(54) PROCESS FOR PRODUCING FIBER-POLYMER COMPOSITES

(71) Applicant: Stora Enso OYJ, Helsinki (FI)

(72) Inventors: Johan Kallstrom, Hyltebruk (SE); Fredrik Kallstrom, Hyltebruk (SE); Martin Malmqvist, Halmstad (SE); Roger Bergstrom, Hyltebruk (SE); Conny Johansson, Laholm (SE); Maria Tornblom, Halmstad (SE); Sofi Karlsson, Burseryd (SE)

(73) Assignee: Stora Enso OYJ, Helsinki (FI)

( * ) Notice: Subject to any disclaimer, the term of this patent is extended or adjusted under 35 U.S.C. 154(b) by 335 days.

(21) Appl. No.: 15/776,305

(22) PCT Filed: Nov. 16, 2016

(86) PCT No.: PCT/IB2016/056892
§ 371 (c)(1),
(2) Date: May 15, 2018

(87) PCT Pub. No.: WO2017/085633
PCT Pub. Date: May 26, 2017

(65) Prior Publication Data
US 2018/0326620 A1    Nov. 15, 2018

(30) Foreign Application Priority Data

Nov. 17, 2015   (SE) .................................... 1551486-2

(51) Int. Cl.
  *B29B 9/06*    (2006.01)
  *B29C 70/12*   (2006.01)
  (Continued)

(52) U.S. Cl.
  CPC ................ *B29B 9/06* (2013.01); *B29B 7/603* (2013.01); *B29B 7/905* (2013.01); *B29B 7/92* (2013.01);
  (Continued)

(58) Field of Classification Search
  CPC ........... B29B 9/06; B29B 15/08; B29B 13/06; B29B 7/94; B29B 7/92; B29B 7/603;
  (Continued)

(56) References Cited

U.S. PATENT DOCUMENTS 3,808,093 A * 4/1974 Hedstrom ............. F26B 17/101
                                                    162/100
4,043,049 A * 8/1977 Hedstrom ............... D21C 9/185
                                                    34/370
(Continued)

FOREIGN PATENT DOCUMENTS

CN    1741882 A    3/2006
GB    2005394 A    4/1979
(Continued)

OTHER PUBLICATIONS

International Search Report for PCT/IB2016/056892, dated Feb. 16, 2017.
(Continued)

*Primary Examiner* — Jeffrey M Wollschlager
(74) *Attorney, Agent, or Firm* — Greer, Burns & Crain, Ltd.

(57) ABSTRACT

The present invention relates to a process for the manufacturing of composite materials from natural fibers and thermoplastic polymers. Examples of fibers are wood fibers originating from pulping processes known as refiner pulp (RMP), thermomechanical pulp (TMP) or chemi-thermomechanical pulp (CTMP), but the process can also be applied to other kinds of natural fiber containing raw materials. In
(Continued)

the process according to the present invention, fibers are introduced from the blowline or the housing of a refiner into a flash tube dryer, separated from humid air in a cyclone, introduced into a compounder and mixed with at least one thermoplastic polymer and the product is subsequently pelletized. The process according to the present invention is advantageously run as a continuous process.

18 Claims, 3 Drawing Sheets

(51) Int. Cl.
| | | |
|---|---|---|
| D21H 11/08 | (2006.01) | |
| B29B 7/94 | (2006.01) | |
| B29B 7/92 | (2006.01) | |
| B29B 7/60 | (2006.01) | |
| B29B 7/90 | (2006.01) | |
| B29B 9/14 | (2006.01) | |
| B29C 48/00 | (2019.01) | |
| B29B 15/08 | (2006.01) | |
| B29B 13/06 | (2006.01) | |
| B27N 1/02 | (2006.01) | |
| B29B 7/46 | (2006.01) | |
| B29C 31/02 | (2006.01) | |
| B29C 48/285 | (2019.01) | |
| B29K 101/12 | (2006.01) | |
| B29K 105/00 | (2006.01) | |
| B29K 511/14 | (2006.01) | |

(52) U.S. Cl.
CPC .................. *B29B 7/94* (2013.01); *B29B 9/14* (2013.01); *B29B 13/06* (2013.01); *B29B 15/08* (2013.01); *B29C 48/0022* (2019.02); *B29C 70/12* (2013.01); *D21H 11/08* (2013.01); *B27N 1/02* (2013.01); *B29B 7/46* (2013.01); *B29C 31/02* (2013.01); *B29C 48/285* (2019.02); *B29C 48/287* (2019.02); *B29K 2101/12* (2013.01); *B29K 2105/0005* (2013.01); *B29K 2511/14* (2013.01)

(58) Field of Classification Search
CPC .. B29B 7/905; B29B 9/14; B29B 7/46; B29C 48/0022; B29C 70/12; B29C 31/02; B29C 48/285; B29C 48/287; D21H 11/08; B27N 1/02; B29K 2101/12; B29K 2105/0005; B29K 2511/14
See application file for complete search history.

(56) References Cited

U.S. PATENT DOCUMENTS

| | | | | |
|---|---|---|---|---|
| 4,055,903 A * | 11/1977 | Hansen | .................. | D21C 9/185 34/380 |
| 4,326,913 A * | 4/1982 | Mattsson | .................. | D21B 1/14 162/17 |
| 4,426,258 A * | 1/1984 | Browning | .............. | D21C 9/004 162/23 |
| 4,537,655 A * | 8/1985 | Henriksson | ............ | D21C 9/185 162/23 |
| 5,075,359 A * | 12/1991 | Castagna | .................. | C08J 3/226 524/13 |
| 5,120,776 A * | 6/1992 | Raj | ............................. | C08J 5/06 524/13 |
| 5,308,896 A | 5/1994 | Hansen et al. | | |
| 5,441,801 A * | 8/1995 | Deaner | .................... | B27N 3/28 428/326 |
| 6,270,883 B1 * | 8/2001 | Sears | .................... | B29C 48/022 428/292.1 |
| 6,284,098 B1 | 9/2001 | Jacobsen | | |
| 6,533,890 B1 * | 3/2003 | Berger | .................. | B27N 3/086 156/296 |
| 6,748,671 B1 * | 6/2004 | Vrbanac | ................. | D21C 9/007 34/427 |
| 7,306,846 B2 * | 12/2007 | Dezutter | .................. | D21C 9/00 428/402 |
| 8,187,423 B1 * | 5/2012 | Glenn | .................... | B29C 70/443 162/141 |
| 8,722,773 B2 * | 5/2014 | Hamilton | .................. | B29B 7/40 524/13 |
| 9,114,550 B2 * | 8/2015 | Cernohous | ................ | B29B 9/06 |
| 9,283,692 B2 * | 3/2016 | Warnes | ..................... | B29B 7/92 |
| 9,604,388 B2 * | 3/2017 | Cernohous | .............. | B29C 48/04 |
| 9,809,687 B2 * | 11/2017 | Immonen | .................. | C08J 5/045 |
| 2003/0186052 A1 | 10/2003 | Crews et al. | | |
| 2008/0213562 A1 | 9/2008 | Przybylinski et al. | | |
| 2009/0123352 A1 * | 5/2009 | Spink | ..................... | B01D 47/06 423/215.5 |
| 2009/0229771 A1 * | 9/2009 | Warnes | ..................... | B27N 1/00 162/28 |
| 2009/0264560 A1 * | 10/2009 | Warnes | ................... | C08L 97/02 524/13 |
| 2011/0293911 A1 * | 12/2011 | Coates | .................... | B32B 5/022 428/220 |
| 2013/0178561 A1 | 7/2013 | Carrubba | | |
| 2013/0207297 A1 | 8/2013 | Cernohous et al. | | |
| 2013/0210965 A1 * | 8/2013 | Hamilton | ................. | C08J 5/045 524/14 |
| 2013/0310489 A1 | 11/2013 | Gass | | |
| 2013/0331518 A1 * | 12/2013 | Immonen | ................. | C08L 1/28 525/54.21 |
| 2014/0228493 A1 * | 8/2014 | Wallen | ..................... | C08K 9/08 524/262 |
| 2017/0370110 A1 * | 12/2017 | Feys | ........................ | B44C 1/24 |

FOREIGN PATENT DOCUMENTS

| | | |
|---|---|---|
| GB | 2278365 | 11/1994 |
| WO | 9513179 A1 | 5/1995 |
| WO | 2003047826 | 6/2003 |
| WO | 2006001717 A1 | 1/2006 |

OTHER PUBLICATIONS

Bengtsson, M. et al. "Extrusion and mechanical properties of highly filled cellulose fibre-polypropylene composites" In: Composites: Part A, 2007, vol. 38, pp. 1922-1931.

Migneault, S. et al. "Effect of Fiber Length on Processing and Properties of Extruded Wood-Fiber/HDPE Composites" In: Journal of Applied Polymer Science, 2008, vol. 110, pp. 1085-1092.

Le Baillif, M. et al. "Effect of the Preparation of Cellulose Pellets on the Dispersion of Cellulose Fibers Into Polypropylene Matrix During Extrusion" In: Journal of Applied Polymer Science, 2010, vol. 115, pp. 2794-2805.

Peltola, H. et al. "Wood based PLA and PP Composites: Effect of fibre type and matrix polymer on fibre morphology, dispersion and Composite properties" In: Composites: Part A, 2014, vol. 61, pp. 13-22.

Chinese Office Action, Application No. 201680066689.5, dated May 27, 2020.

* cited by examiner

PROCESS FOR PRODUCING FIBER-POLYMER COMPOSITES

This application is a U.S. National Stage under 35 U.S.C. § 371 of International Application No. PCT/IB2016/056892, filed Nov. 16, 2016, which claims priority to Swedish Patent application no. 1551486-2, filed Nov. 17, 2015.

FIELD OF THE INVENTION

The present invention relates to a process for the manufacturing of composite materials from natural fibers and thermoplastic polymers. Examples of fibers are wood fibers originating from pulping processes known as refiner pulp (RMP), thermomechanical pulp (TMP) or chemi-thermomechanical pulp (CTMP), but the process can also be applied to other kinds of natural fiber containing raw materials.

In the process according to the present invention, fibers are introduced from the blowline or the housing of a refiner into a flash tube dryer, separated from humid air in a cyclone, introduced into a compounder and mixed with at least one thermoplastic polymer and the product is subsequently pelletized. The process according to the present invention is advantageously run as a continuous process.

BACKGROUND

In the effort to lower their emission of greenhouse gases, their "carbon footprint", more and more manufacturers and brand owners strive to replace petroleum based products with those obtained from renewable raw material sources. This is presently leading to a market breakthrough for composites, from polymer resins and wood fibers or other natural materials, as replacements for pure polymers.

The most well known and most widely spread such materials are blends of commodity polymers such as polyolefins or PVC and wood flour or fractionated sawdust. Lately, a number of products consisting of polymers and chemical pulp (where the cellulose fibers have been separated from the lignin and hemicelluloses with the help of strong chemicals) have entered the market. Wood flour, with its larger particles with low aspect ratios, provides stiffness to the composite but does not increase the tensile strength in any significant way and the impact resistance is significantly decreased. Fibers of chemical pulp are long and slender and provide both strength and stiffness and reduce the impact resistance to a lesser degree but are more expensive.

Mechanical pulps, with their high yields, are cheaper than chemical pulps. The fibers in them are strong and stiff and have less hydrophilic surfaces, since the lignin has not been removed. Thermomechanical pulp (TMP) and chemi-thermomechanical pulp (CTMP) are the types of mechanical pulp that has the most well preserved fiber length after refining. Though these types of pulps still contain a portion of fines material and the average fiber length normally is significantly shorter than for chemical pulps from the same wood species, the strength properties of TMP-polymer composites have been found to be at least as good as for composites made from chemical pulp fibers (D. Maldas, B. V. Kokta and C. Daneault, Journal of Vinyl Technology, 1989, vol. 11, pp. 90-99; M. Kazayawoko, J. J. Balatinecz, R. T. Woodhams and S. Law, International Journal of Polymeric Materials, 1997, vol. 37, pp. 237-261; H. Peltola, E. Pääkkörinen, P. Jetsu and S. Heinemann, Composites: Part A, 2014, vol. 61, pp. 13-22). Such composites have been known for a long time but have generally been prepared more or less by hand, in lab scale (D. Maldas, B. V. Kokta and C. Daneault, Journal of Applied Polymer Science, 1989, vol. 38, pp. 413-439; U.S. Pat. Nos. 4,376,144; 4,791,020). To fully utilize the technical and economic advantages of TMP or CTMP in polymer composites these must be produced by an efficient, automated process which uses no excessive energy, requires a minimum of manual intervention and is easily scaled up to handle the pulp production capacity of an industrial size refiner line. There are several challenges in this, including how to dry the pulp without forming fiber-fiber bonds and how to handle the material, with very low bulk density that emanates from the drying process.

There is thus a need for an improved process for preparing composite products. In particular, there is a need for a more efficient process that can also be utilized for continuous production.

SUMMARY OF THE INVENTION

The present invention concerns a process for preparing a fiber-polymer composite product comprising the steps of
a) introducing fibers from the blowline or from the housing of a refiner, into a flash tube dryer;
b) separating the dried fibers obtained in step a) from humid air in a cyclone;
c) introducing the dried fibers obtained in step b) into a compounder where the fibers are mixed with at least one polymer; and
d) pelletizing the product of step c).

The present invention is directed to a process for the manufacturing of composites wherein, in one embodiment, the fibers originate from RMP, TMP or CTMP production processes. In this process, fibers from RMP, TMP or CTMP are extracted directly from the housing or from the blow line of a refiner, typically at 40-50% dry content, prepared for compounding without further immersion in water, dried, in some embodiments compacted to increase the bulk density to facilitate the possible buffering of the system and the feeding into the further process steps and, finally, mixed with a thermoplastic polymer to make a composite that is formed into pellets or granules and ready for further processing in plastic industry standard equipment. The process can also be used with other kinds of fibers, such as fibers from bagasse, bamboo, flax, hemp, kenaf and sisal.

In one embodiment of the present invention, in step a) only part of the flow from the refiner blow line is introduced into the flash tube dryer.

In one embodiment of the present invention, in step a) the entire flow from the refiner blow line is introduced into the flash tube dryer.

In one embodiment of the present invention, in step a) part of the flow from the refiner housing is introduced into the flash tube dryer.

In one embodiment of the present invention, the process is continuous.

In one embodiment of the present invention, a compactor is used between step b) and step c) to increase the bulk density of the product of step b). The fibers enter the compactor at the moisture content with which they left the drier, without rewetting, to prevent fiber-fiber bonds to form in the compaction process. In one embodiment 0-3% moisture can be added to the fibers inside the compactor to facilitate the process or as a carrier of additives in solution or emulsion form. In one embodiment of the present invention, the compacted material has a bulk density of 100-550 kg/m$^3$. In one embodiment of the present invention, the compacted material has a bulk density of 150-300 kg/m$^3$.

In one embodiment of the present invention, the product of step b) is introduced into a mixing unit where additives are added, prior to step c). In one embodiment, the additives are selected from coupling agents, fire retardants, UV protectors, fungicides, dyes, lubricants, dispersion aids, impact modifiers, de-bonding agents, compatibilizing agents, structure modifiers and flow promotors in solid, liquid, emulsion or dispersion form.

In one embodiment of this invention the dried fiber is combined and mixed with, at least a portion of, the polymer in a mixer/compactor/pelletiser.

In one embodiment of the present invention, additives are added to the fibers in liquid, dispersion or emulsion form prior to or shortly after the fibers entering the flash tube dryer.

In one embodiment of the present invention, additives are added to the fibers in liquid, dispersion or emulsion form inside of the compactor.

In one embodiment of the present invention, additives are added in the compounder or at the time the material enters the compounder.

In one embodiment of the present invention, a buffer silo is incorporated between step b) and step c). In one embodiment, the buffer silo is equipped such that material can be transported to and/or from the silo using tube chain conveyers.

In one embodiment of the present invention, the fibers originate from pulping processes known as refiner pulp, thermomechanical pulp or chemi-thermomechanical pulp. In one embodiment, the fibers originate from hardwood. In another embodiment, the fibers originate from softwood.

Figure 1:
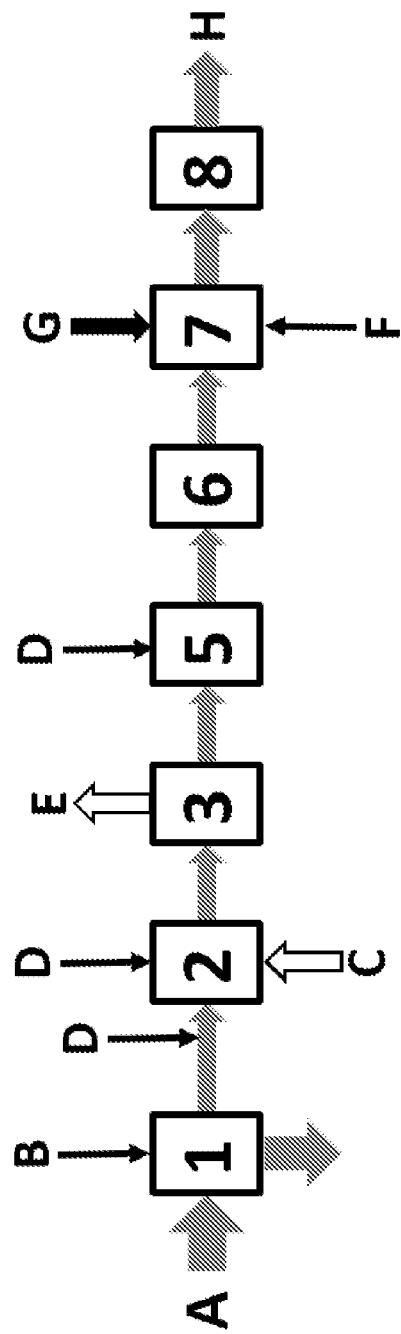
FIG. 1 shows a flow chart of one embodiment of the present invention.

The most important units of process equipment have been denoted by the following legends:

| Legend | Process equipment |
| --- | --- |
| 1 | Fiber flow regulator (optional) |
| 2 | Flash tube dryer |
| 3 | Cyclone |
| 4 | Mixing unit (optional) |
| 5 | Compactor (optional) |
| 6 | Buffer silo (optional) |
| 7 | Compounder |
| 8 | Pelletizer |

The most important material streams have been denoted by the following legends:

| Legend | Materials stream |
| --- | --- |
| A | Fibers from refiner blowline or housing of a refiner |
| B | Pressurized air or steam (optional) |
| C | Hot air from heater |
| D | Additives (optional) |
| E | Humid air |
| F | Additives in solid or liquid form (optional) |
| G | Polymers |
| H | Finished product |

DETAILED DESCRIPTION

In the application to fibers originating from TMP, CTMP or RMP, the process line is connected to the refiner either to the housing of the refiner or to the blow line.

The fiber material from the refiner, with 30-60%, normally 40-50%, dry content (A) is typically continuously extracted, in some embodiments through a fiber flow regulator (1) to regulate the inflow into the process.

In one embodiment of the present invention, part of the flow from the refiner blow line is introduced into the process. In another embodiment of the invention, the entire flow from the refiner blow line is introduced into the process. In another embodiment of the invention, part of the flow from the refiner housing is introduced into the process.

The fiber flow regulator (1) can be used to regulate the inflow of material from the refiner into the flash tube dryer.

Before or during the drying process (2), additives (D) may be added, for example by spraying. Examples of additives are coupling agents, bleaching agents, dyes, surface modifiers, de-bonders, and softeners. The additives can for example by added in solution, dispersion or emulsion form (D).

After the drying step, a cyclone (3) separates the fibers from the, now, humid air (E). The cyclone is equipped with e.g. a rotary valve or other suitable valve or transporter at the bottom. In one embodiment of the present invention the pulp fibers exit the cyclone with a moisture content of 2-15%. In one embodiment of the invention the moisture content of the fibers is 5-12% at exit from the cyclone. In a further embodiment of the invention the moisture content of the fibers is 5-10% at exit from the cyclone.

The treated fibers are typically fluffy, with a low bulk density. Because of this, a compactor (5) may be incorporated into the process line. The fibers enter the compactor at the moisture content with which they left the cyclone, without rewetting. This is to prevent fiber-fiber bonds from forming in the compaction process.

In one embodiment, the compactor may be of the type of a pelletizer, operating outside of the conditions that are normally applied to make firm, consolidated pellets. In one embodiment 0-3% moisture can be added to the fibers inside the compactor to facilitate the process or as a carrier of additives in solution, dispersion or emulsion form (D). The compacted fibers should have a bulk density of typically 100-550 kg/m$^3$. In one embodiment of the present invention, the bulk density of the compacted fibers is 100-350 kg/m$^3$. In one embodiment of the present invention, the bulk density of the compacted fibers is 150-300 kg/m$^3$.

In one embodiment of the present invention the compacted fiber material has a moisture content of 5-10% upon exit from the compactor and entering into the compounder (7) or buffer silo (6). In another embodiment the material has a moisture content of 6-9% upon exit from the compactor and entering into the compounder (7) or buffer silo (6).

A buffer silo (6) may be incorporated into the process line to accommodate for mismatches in production rates between different process steps. In one embodiment, the silo is equipped such that material can readily be transported to and/or from the silo using tube chain conveyers.

From the buffer silo (6), the compactor (5) or directly from the cyclone (3) the fibers (optionally compacted) can be fed at a steady rate through a dosing unit, preferably a weight controlled, which may or may not be designed to handle low density materials, and a side feeder (preferably twin screw) which may or may not be designed to handle low density materials, into the compounder (7) to mix with the polymer (G) and optionally additional additives (F).

The polymer (G) is fed, optionally together with additives in solid or liquid form (F), to the main inlet of the compounder or through a side feeder. Examples of additives that can be added in or before the compounder include coupling agents, low molecular polymers, flow enhancers, viscosity modifiers, lubricants, impact modifiers, dispersion agents, pigments, inorganic fillers, UV protectors, fungicides, wood flour, saw dust or milled knot wood and synthetic fibers such as glass fiber or carbon fiber. The additives may be added as a master batch containing one or more of the listed additives. It is favorable if the compounder is of the co-rotating twin screw design. On discharge from the compounder, the thus formed fiber-polymer composite (H) is formed into pellets by a pelletizer (8). In one embodiment of the present invention, the pellets are of dimensions similar to those normally handled in the plastics processing industry.

The matrix polymer (G) can be any thermoplastic polymer suitable for use in composite products. Examples of such polymers include high-density polyethylene (HDPE), low-density polyethylene (LDPE), polypropylene (PP), polybutene, polybutadiene, other polyolefins, polyvinyl chloride (PVC), acrylonitrile butadiene styrene (ABS), ethylene-vinyl acetate (EVA), polystyrene (PS), polylactic acid (PLA) and co-polymers of these In one embodiment of the present invention, a mixture of polymers is used. In one embodiment of the invention, the polymer has been recycled. In one embodiment of the present invention, the polymer is bio-based, i.e. originating from a renewable raw material.

Figure 2:
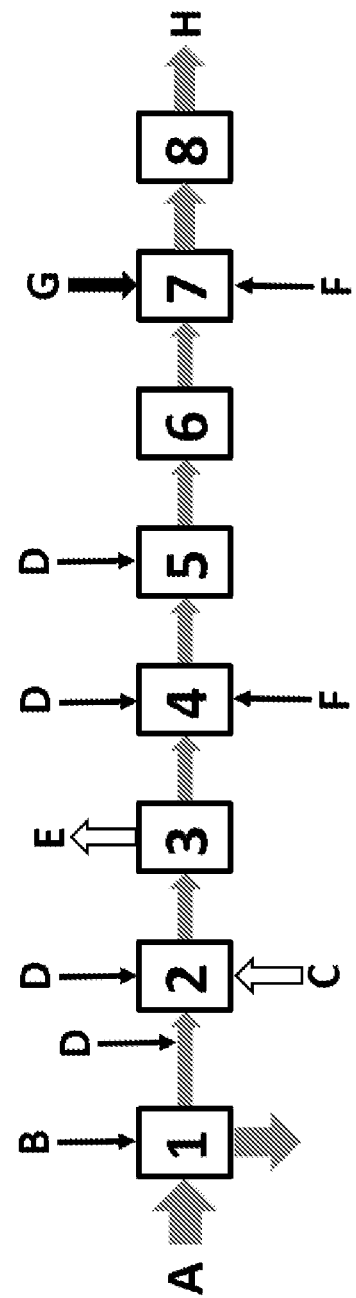
FIG. 2 shows a flow chart of another embodiment of the present invention, which, in addition to the embodiment illustrated in FIG. 1 also includes a mixing unit for mixing of the fibers with additives

In the embodiment of the invention illustrated in FIG. 2, a mixing unit (4) is added to the process to facilitate the addition of additives in solid or liquid form prior to the optional compacting step. Suitable additives for addition in the mixing unit include emulsions and/or dispersions. Examples of additives are matrix polymers, coupling agents, low molecular polymers, flow enhancers, viscosity modifiers, lubricants and impact modifiers.

In one embodiment of this invention the dried fiber is combined with, at least a portion of, the matrix polymer and optionally other additives as described above, mixed and formed into mixed pellets in a mixer/compactor/pelletizer such as the type supplied by MHG Machinenfabrik Hombak GmbH. The output from this operation can be stored in the buffer silo or fed directly into the compounder.

Figure 3:
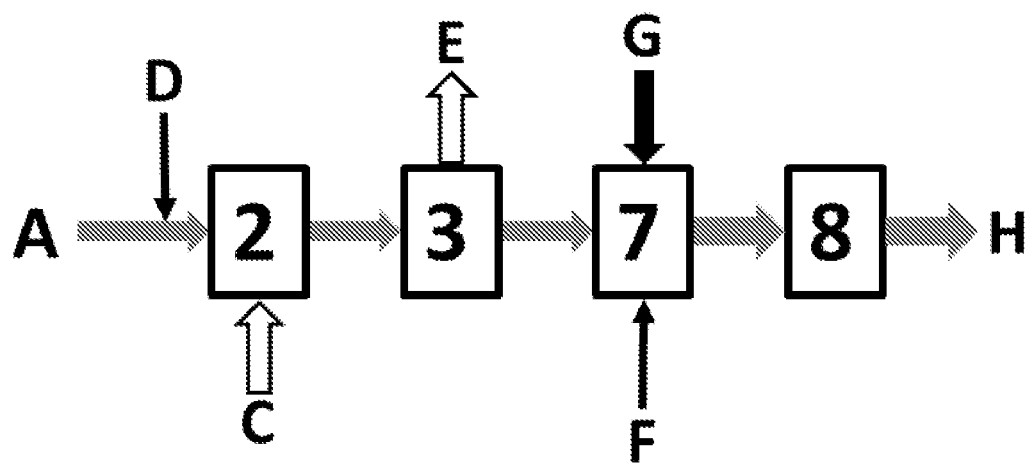
FIG. 3 shows a flow chart of another embodiment of the present invention, which comprises the main steps of the process according to the present invention.

In FIG. 3 the present invention is shown in its most basic embodiment, where there is no fiber flow regulator on the refiner blow line and the full production of the refiner is utilized in the process. As illustrated in FIG. 3, the compounding process also operates without compaction of the fibers or a buffer for these. In this embodiment, the compounder is typically equipped with a dosing unit and feeder that can handle material of a low bulk density.

Suitable additives that can be used in the process according to the present invention are mentioned above and include coupling agents, such as maleic acid anhydride grafted polymers, alternatively polymers grafted with silane functionalities. Further additives include fire retardants, UV protectors, fungicides, dyes, pigments, lubricants, dispersion aids, impact modifiers, de-bonding agents, compatibilizing agents, structure modifiers and flow promotors, wood flour, saw dust, milled knot wood or a masterbatch containing one or more of the additives listed above.

The flash tube dryer (2) is typically a commercially available flash tube dryer operating under process parameters that can readily be selected by a person skilled in the art.

The cyclone (3) is typically a commercially available cyclone operating under process parameters that can readily be selected by a person skilled in the art. Typically, the cyclone is equipped with a rotary valve.

The mixing unit (4) is typically a continuous mixing unit or a mixer/compactor/pelletizer such as the type supplied by MHG Machinenfabrik Hombak GmbH, operating under process parameters that can readily be selected by a person skilled in the art.

The compactor (5) may be a commercially available pelletizer operating under different process parameters than what would typically be used in a pelletizer. The compacted fibers should have a bulk density of typically 100-550 kg/m$^3$. In one embodiment, the compactor is a pelletizing press Kahl flat die 33-390.

The buffer silo (6) is typically a silo that is used to accommodate for variations in production rates between different process steps. The size of the buffer silo can readily be determined by a person skilled in the art, depending on the expected production rates.

The compounder (7) is typically a commercially available compounder, working under conventional process parameters. In one embodiment, the compounder is a twin-screw co-rotating extruder.

The pelletizer (8) is typically a commercially available pelletizer operating under process parameters that can readily be selected by a person skilled in the art.

In view of the above detailed description of the present invention, other modifications and variations will become apparent to those skilled in the art. However, it should be apparent that such other modifications and variations may be effected without departing from the spirit and scope of the invention.

The invention claimed is:

1. A process for preparing a fiber-polymer composite product comprising the steps of
   a) introducing fibers originating from pulping processes selected from the group consisting of refiner pulp, thermomechanical pulp, or chemi-thermomechanical processes from a blow line or from a housing of a refiner directly into a flash tube dryer without further immersion in water, the fibers from the blow line or the housing at 30-60% dry content;
   b) separating the dried fibers obtained in step a) from humid air in a cyclone;
   c) introducing the dried fibers from step b) into a pelletizer operated to increase a bulk density of the product of step b), forming compacted fiber material having a bulk density of 100-350 kg/m$^3$;
   d) introducing the compacted fiber material obtained in step c) into a compounder where the compacted fiber material is mixed with at least one polymer; and
   e) pelletizing the product of step d).

2. The process according to claim 1, wherein the fibers are from the refiner blow line, and wherein in step a) only part of the flow from the refiner blow line is introduced into the flash tube dryer.

3. The process according to claim 1, wherein the fibers are from the refiner blow line, and wherein in step a) the entire flow from the refiner blow line is introduced into the flash tube dryer.

4. The process according to claim 1, wherein in step a) part of the flow from the refiner housing is introduced into the flash tube dryer.

5. The process according to claim 1, wherein the process is continuous.

6. The process according to claim 1, wherein the dried fibers fed to the pelletizer have a moisture content of 2-15%.

7. The process according to claim 6, wherein the dried fibers fed to the pelletizer have a moisture content of 5-12%.

8. The process according to claim 7, wherein the dried fibers fed to the pelletizer have a moisture content of 5-10%.

9. The process according to claim 1, wherein the compacted fiber material from the pelletizer has a moisture content of 5-10%.

10. The process according to claim 9, wherein the compacted fiber material from the pelletizer has a moisture content of 6-9%.

11. The process according to claim 1, wherein the compacted fiber material from the pelletizer does not need any further drying before feeding into the compounder.

12. The process according to claim 1, wherein the compacted fiber material from step c) has the bulk density of 150-300 kg/m$^3$.

13. The process according to claim 1, wherein the product of step b) is introduced into a mixing unit where additives are added, prior to step d).

14. The process according to claim 13, wherein the additives are selected from matrix polymers, coupling agents, fire retardants, UV protectors, fungicides, dyes, lubricants, dispersion aids, impact modifiers, de-bonding agents, compatibilizing agents, structure modifiers and flow promotors in solid, liquid, emulsion or dispersion form.

15. The process according to claim 1, wherein additives are added to the fibers in liquid, dispersion or emulsion form prior to or after the fibers enter the flash tube dryer.

16. The process according to claim 1, wherein additives are added before or in the compounder.

17. The process according to claim 1, wherein a buffer silo is incorporated between step c) and step d).

18. The process according to claim 17, wherein the buffer silo is equipped such that material can be transported to and/or from the silo using tube chain conveyers.

* * * * *